W. I. BALLENTINE.
MOLDING MACHINE.
APPLICATION FILED MAY 8, 1916.
1,214,117.
Patented Jan. 30, 1917.
2 SHEETS—SHEET 1.
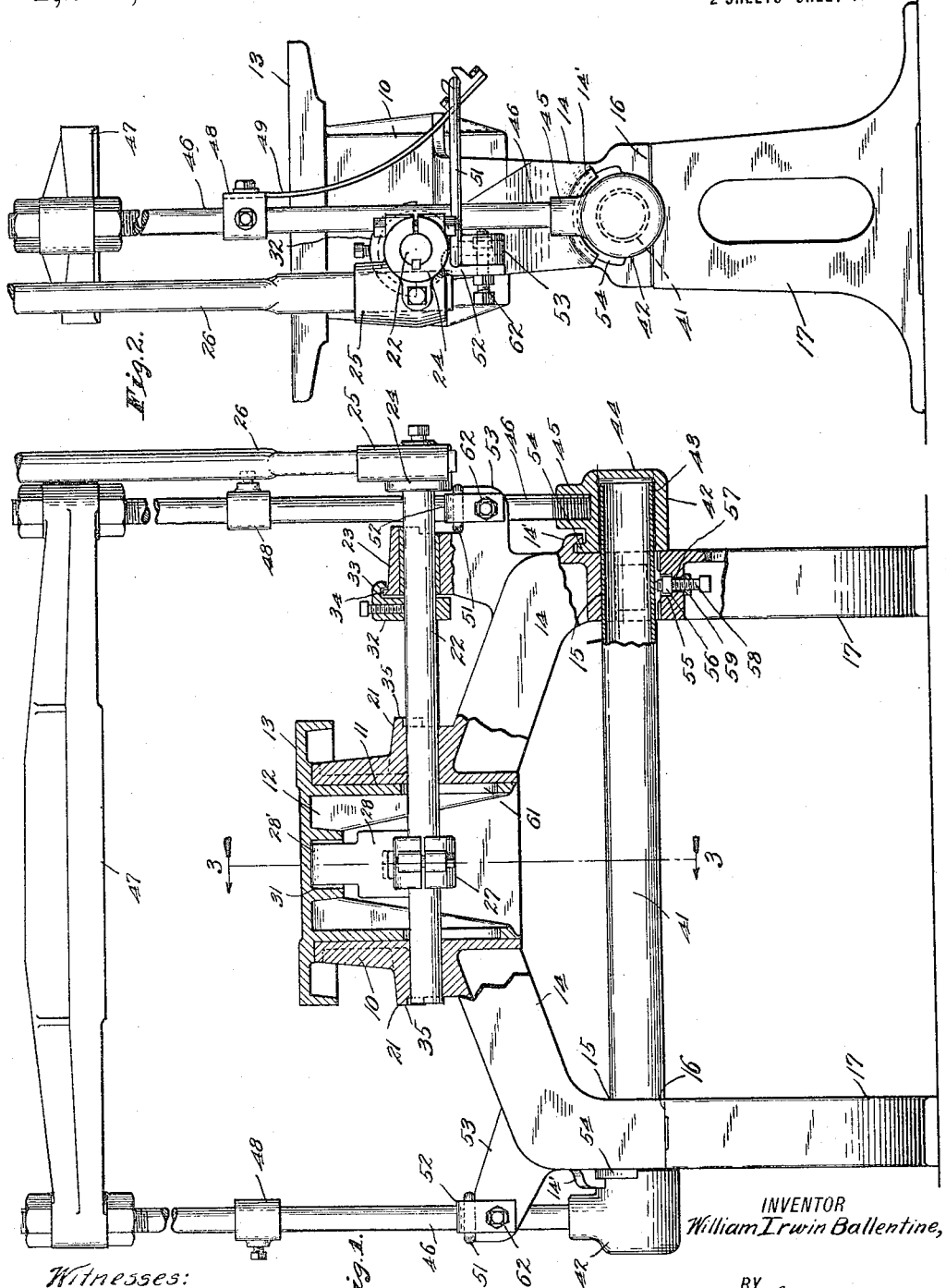
INVENTOR
William Irwin Ballentine,
Witnesses:
BY
Hood & Schley
ATTORNEYS

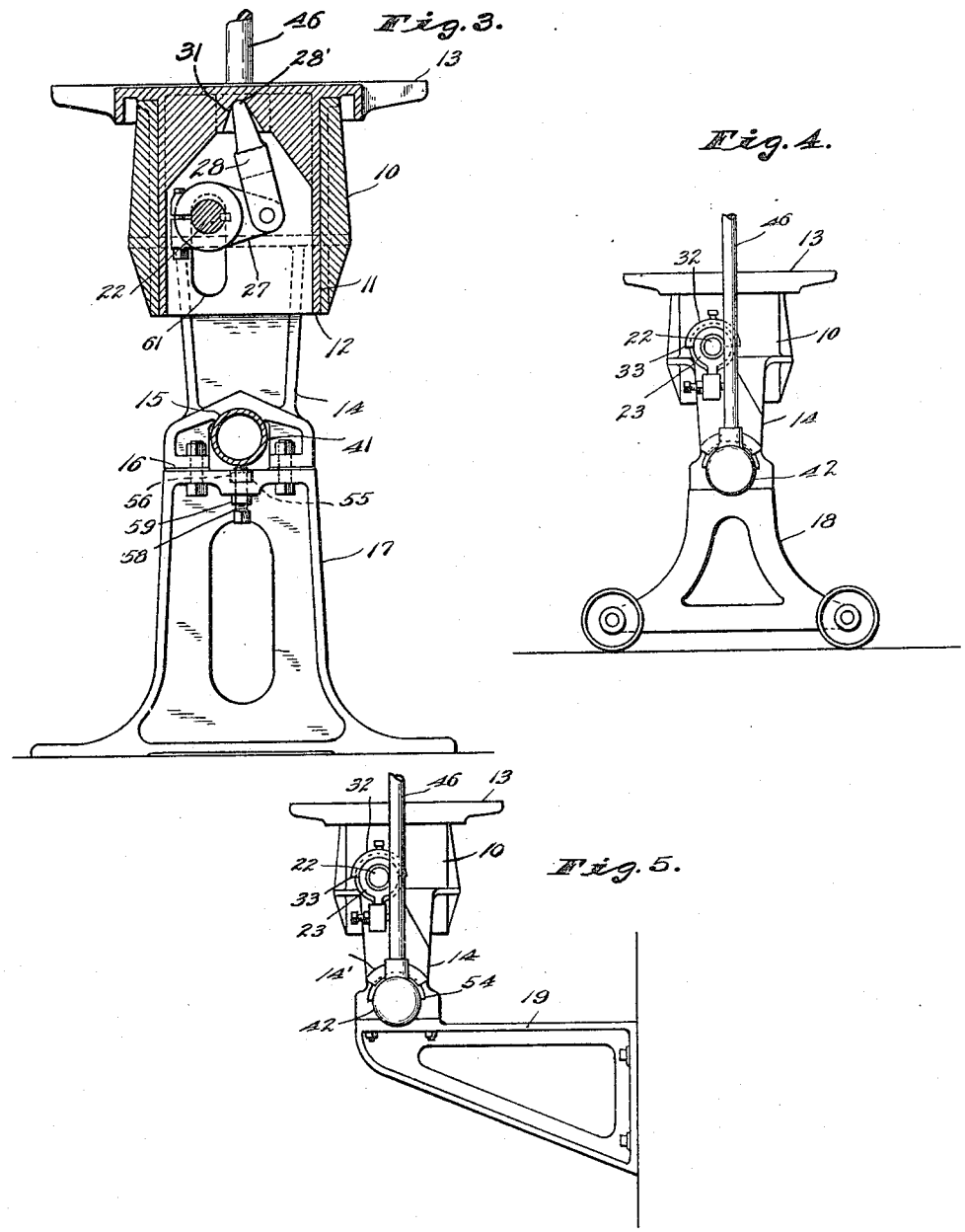

UNITED STATES PATENT OFFICE.

WILLIAM I. BALLENTINE, OF INDIANAPOLIS, INDIANA, ASSIGNOR TO THE B. & B. MFG. CO., OF INDIANAPOLIS, INDIANA, A CORPORATION OF INDIANA.

MOLDING-MACHINE.

1,214,117.            Specification of Letters Patent.      Patented Jan. 30, 1917.

Application filed May 8, 1916. Serial No. 96,097.

*To all whom it may concern:*

Be it known that I, WILLIAM IRWIN BALLENTINE, a citizen of the United States, residing at Indianapolis, in the county of Marion and State of Indiana, have invented a new and useful Molding-Machine, of which the following is a specification.

The object of my invention is to produce a hand-operable molding machine, having improved details of construction of such character as to cheapen the cost of manufacture and to thoroughly protect the principal working parts against the entry of sand.

The accompanying drawings illustrate my invention.

Figure 1 is a front elevation in partial vertical section of a machine embodying my improvement; Fig. 2 a side elevation; Fig. 3 a section on line 3—3 of Fig. 1; Fig. 4 an elevation showing the application of the main body of the machine to legs which produce a portable structure; and Fig. 5 a similar view showing the main body of the machine applied to a wall bracket.

In the drawings, 10 indicates the central, hollow portion of the main body of the machine, said portion having a central vertical passage 11, in which is fitted the hollow stem 12 of the flask-carrying plate or table 13. Extending outwardly and downwardly from two opposite sides of the main body 10 are legs 14, which, at their outer ends, project downwardly and have transverse pockets 15 formed therein. The lower surfaces 16 of the legs 14 are formed for the reception of any desired form of supporting structure, as, for instance, the stationary leg 17 shown in Figs. 1–3, or the portable leg 18, shown in Fig. 4, or the wall bracket 19, shown in Fig. 5.

Formed in the main body 10, at right angles to passage 11, are alined shaft bearings 21, 21, in which is journaled a rock shaft 22. The rock shaft 22 is further supported by an additional bearing 23, carried by one of the legs 14, and the outer end of this shaft carries a head 24 having a split portion adapted to be clamped around shaft 22, and also having a handle-receiving portion 25 adapted to receive the hand lever 26 which is longitudinally adjustable in the portion 25.

Clamped to shaft 22, within the hollow stem 12, is a lever 27, to the outer end of which is pivoted the lower end of a link 28, the upper end of which is rounded at 28' and seated within pocket 31 formed at the upper end of the interior of the hollow stem 12.

In order to hold shaft 22 longitudinally, I attach to the shaft, between bearing 23 and the adjacent bearing 21, a collar 32, which is provided for about half its circumference with an overhanging lip 33, which is spaced from the main body of the collar sufficiently to overlie a peripheral flange 34 which is carried by the upper side of the bearing block 23, the arrangement being such that the collar may be associated with the bearing, as indicated in Fig. 1, and shaft 22 then slipped into position. The overhanging lip 33 serves to hold shaft 22 in axial position and also protects bearing 23 from sand which would otherwise fall upon shaft 22 adjacent this bearing. The exposed ends of bearings 21 are similarly protected from sand by the overhanging flanges 35 which are slightly spaced from the shaft, as clearly shown in Fig. 1.

Mounted in the pockets 15 is a pipe 41, the ends of which project beyond the sides of legs 14. Rotatably mounted upon each projected end of pipe 41, is a casting 42 provided with a pocket 43 which fits the pipe and is closed at its outer end, as indicated at 44, in order to protect against the entry of sand between the casting and pipe. At its upper side the casting 42 is provided with a threaded lug 45 adapted to receive the lower threaded end of a rod 46. The upper ends of rods 46 carry a cross head 47 which may be swung into and out of position above the flask-carrying table 13. In order to support the cross head in either operative or inoperative position, each rod 46 carries a fitting 48 to which is attached the upper end of a flat spring 49, to the lower end of which is hooked one end of the link 51, the opposite end of which is hooked into a hook 52, secured to a stop ear 53 which is projected into the path of movement of rod 46.

In order to hold the castings 42 in place, without the use of removable fastening means, and at the same time to protect the joint from sand, I provide each casting, at its inner end, with a peripheral flange 54, which coöperates with an overhanging arc-shaped lip 14' carried by the outer side of leg 14. In assembling this structure, a casting 42 will be first slipped upon the end of pipe 41, with flange 54 upon its lower side. Thereupon the casting may be turned to bring the flange 54 and lug 45 uppermost and rod 46 then screwed into the lug.

As previously stated, legs 14 may be attached to any desired support, the point of junction being made just below pipe 41 for convenience of manufacture and assembly. In order to firmly clamp pipe 41 in place, without the necessity of threading any of the castings with which the pipe is associated, I provide the upper face of the support with a polygonal pocket 55 formed to receive a standard nut 56. At the bottom of this pocket is a perforation 57 for the free reception of the threaded shank of a standard bolt 58, which carries a check nut 59, the arrangement being such that nut 56 forms the abutment for bolt 58 in its clamping action against pipe 41, driving said pipe into pocket 15; whereupon the check nut 59 may be screwed up against the under side of the casting, and thus lock the bolt 58 in adjusted position.

Stem 12 is the full length of passage 11 and is, therefore, slotted at its sides, as indicated at 61, the shaft 22 passing through these slots.

A bolt 62 is mounted in each stop ear 53 in the same manner that bolt 58 is mounted to form an adjustable abutment for each rod 46.

It will be noticed that the apparatus may be produced with a minimum amount of machine work, and that the principal wearing parts are thoroughly protected from sand, this being especially true of those parts which carry the vertically movable flask-carrying table 13.

In operation, the flask with the pattern and sand put in it in the usual manner is placed on the table 13, the cross head 47 is swung over the table to the position shown, and the handle 26 is operated to raise the table 13 and compress the sand in the flask between such table and the cross head. If desired, the compression of the sand may be obtained wholly in this manner, but preferably the handle 26 is oscillated a number of times so that the table 13 is alternately raised and allowed to drop, and when it drops against the upper edge of the hollow portion of the main body 10 produces a jarring which effectively serves to compact the sand. The dropping of the table 13 is a free dropping, for there is no fixed connection between the link 28 and the table, and the round upper end 28' of the link moves away from the table upon the drop-producing movement of the handle 26 to allow the table 13 to follow under the action of gravity and to drop against the main body 10 to produce the aforesaid jarring. After sufficient jarring has taken place, the final compressing is done between the table 13 and cross head 47, and then the cross head is swung aside and the table 13 allowed to descend and the mold removed.

I claim as my invention:

1. A molding machine comprising a main body having a vertical stem-receiving passage, a flask-carrying table provided with a hollow stem mounted in said passage, a rock shaft journaled in said main body within and across said passage, a lever mounted within said passage upon said shaft, and a link arranged within said hollow stem and connecting the lever and flask-carrying table.

2. A molding machine comprising a main body having a vertical stem-receiving passage, a flask-carrying table provided with a hollow stem mounted in said passage, a rock shaft journaled in the main body within and across said passage, and connections protected by said hollow stem, between the shaft and flask-carrying table.

3. In a molding machine, the combination with the main body thereof, of a cylindrical projection carried thereby, a fitting having a pocket sleeved over said projection and journaled thereon, said fitting having a segmental circumferential flange at its inner end, an overhanging segmental protecting lip carried by said main body and projecting over said segmental flange and holding the same axially in place, an arm carried by said fitting, and a cross head carried by said arm.

4. A molding machine comprising a main body having a vertical stem-receiving passage, a flask-carrying-table having a hollow stem mounted in said passage, a shaft journaled in the main body across said passage, means carried by the shaft within said stem for reciprocating the flask-table by oscillation of the shaft, an additional bearing for said shaft, a collar carried by the shaft adjacent the inner end of said bearing, said collar carrying a segmental lip overhanging the adjacent end of said bearing.

5. A molding machine, comprising a main body having a vertical stem-receiving passage, a flask-carrying table provided with a hollow stem which is mounted in said passage and vertically slidable therein, a rock shaft journaled in said main body below said table, an arm mounted upon said shaft, and a link pivoted to said shaft and projecting upward into said hollow stem for lifting the table upon the turning of said shaft, said link and said table being connected only as the table rests on the link end.

6. A molding machine, comprising a main body having a vertical stem-receiving passage, a flask-carrying table provided with a hollow stem mounted in said passage and vertically slidable therein, a rock shaft journaled in said main body below said table, an arm mounted upon said shaft, and a link pivoted to said shaft and projecting upward into said hollow stem for lifting the table upon the turning of said shaft.

In witness whereof, I have hereunto set my hand at Indianapolis, Indiana, this second day of May, A. D. one thousand nine hundred and sixteen.

WILLIAM I. BALLENTINE.

Copies of this patent may be obtained for five cents each, by addressing the "Commissioner of Patents, Washington, D. C."